United States Patent [19]

Putt

[11] 4,103,590

[45] Aug. 1, 1978

[54] FILTER FOR A SERVOMOTOR

[75] Inventor: James Basil Putt, Granger, Ind.

[73] Assignee: The Bendix Corporation, Southfield, Mich.

[21] Appl. No.: 776,393

[22] Filed: Mar. 10, 1977

[51] Int. Cl.² .......................... F15B 9/10; F15B 25/02; F15B 21/04
[52] U.S. Cl. ........................................ 91/376 R; 91/6; 92/78; 55/309; 55/313
[58] Field of Search ....................... 92/78; 55/309, 313, 55/484; 91/376 R, 369 R, 369 A, 369 B, 6

[56] References Cited

U.S. PATENT DOCUMENTS

| | | | |
|---|---|---|---|
| 3,897,716 | 8/1975 | Ramage | 92/78 |
| 3,972,263 | 8/1976 | Welsh, Jr. | 92/78 |

*Primary Examiner*—Paul E. Maslousky

*Attorney, Agent, or Firm*—Leo H. McCormick, Jr.; Ken C. Decker

[57] ABSTRACT

A filter and boot combination through which air is supplied to a pneumatically operated servomotor. The boot has a cylindrical body which is fixed to the servomotor housing and an end closure which surrounds an input push rod. The boot has a first series of openings in the end closure and a second series of openings in the cylindrical body to provide a series of air flow paths into the servomotor. A first filter is located adjacent the first series of openings and a second filter has a peripheral surface which abuts the second series of openings in the boot. A chamber is created between the inner periphery of the second filter, the first filter and the push rod. The air flows in the series of flow paths through the filters and is combined in the chamber before presentation to a control valve which regulates the operation of the servomotor in response to an input force supplied by an operator through the push rod.

7 Claims, 3 Drawing Figures

FILTER FOR A SERVOMOTOR

BACKGROUND OF THE INVENTION

Pneumatic servomotors, such as disclosed in U.S. Pat. No. 3,106,873 are constructed in such a manner that air from the surrounding environment is directly presented to the rear chamber of the servomotor in response to an operator input force being applied to a control valve. As air enters the rear chamber, a differential pressure is created across a movable wall which supplies a master cylinder with an operational force sufficient to make a brake application. However, after a period of use, the operation of such servomotor can become unacceptable since airborne contaminates can adversely affect the operational control valve. Consequently, in-line air filters are required in the air supply conduit to prevent contaminants from being communicated to the control valve. Unfortunately, after extended periods of use, such in-line air filters can also become contaminated and the air flow therethrough reduced. As a result, such servomotors cannot meet the brake standardization test currently proposed by the United States Department of Transportation.

SUMMARY OF THE INVENTION

I have devised a filter and boot combination which allows air to flow from the atmosphere along any of several flow paths to the control valve and thereby permit the rate of flow of air into the servomotor to remain substantially unchanged even though one or more of the flow paths become blocked by airborne contaminants.

The boot has a cylindrical body and closure member. The cylindrical body has a first end fixed to the housing of the servomotor and a second end attached to an end closure member. The end closure member has an axial opening through which the input push rod extends for actuating the control valve. A first series of openings are located in the end closure member and a second series of openings are located adjacent the second end of the cylindrical body. A first filter which surrounds the push rod is located adjacent the end closure member. The peripheral face of the first filter extended to a plane along the radial center of the second series of openings. A second filter, which is urged toward the first filter by a lip on the cylindrical body, seals the second openings from the interior of the cylindrical body. The second filter has an inner peripheral surface which cooperates with the first filter and the input push rod to create a mixing chamber. Air follows a first flow path into the chamber by way of the first series of openings in the end closure member and the first filter and a second flow path into the chamber by way of the second series of openings in the cylindrical body and first and second filter. Air present in the mixing chamber flows into a passage in the hub for communication to the rear chamber in response to movement of the control valve by the input push rod. Should the airflow through either the first or second filter be restricted, air flows in a third flow path along the interface of the first and second filters into the mixing chamber so that the operation of the servomotor remains substantially the same at all times irrespective of the flow path into the control valve area.

It is the object of this invention to provide a pneumatically operated servomotor with a flow control means through which operational air is presented along several flow paths to the servomotor.

It is another object of this invention to provide a servomotor with a filter and boot combination through which air is presented to the servomotor by flowing through several flow paths to assure an adequate quantity of operational air should some of the flow paths become blocked by airborne contaminants after an extended period of use.

It is another object of this invention to provide a filter and boot combination for use with a pneumatically operated servomotor which allows air to bypass the filter and flow to a control valve for distribution to the servomotor in response to an operator input force should the filter become inoperative through contamination by airborne particles.

These and other objects should be apparent from reading this specification and viewing the drawings.

DETAILED DESCRIPTION OF THE INVENTION

Figures 1, 2, 3:
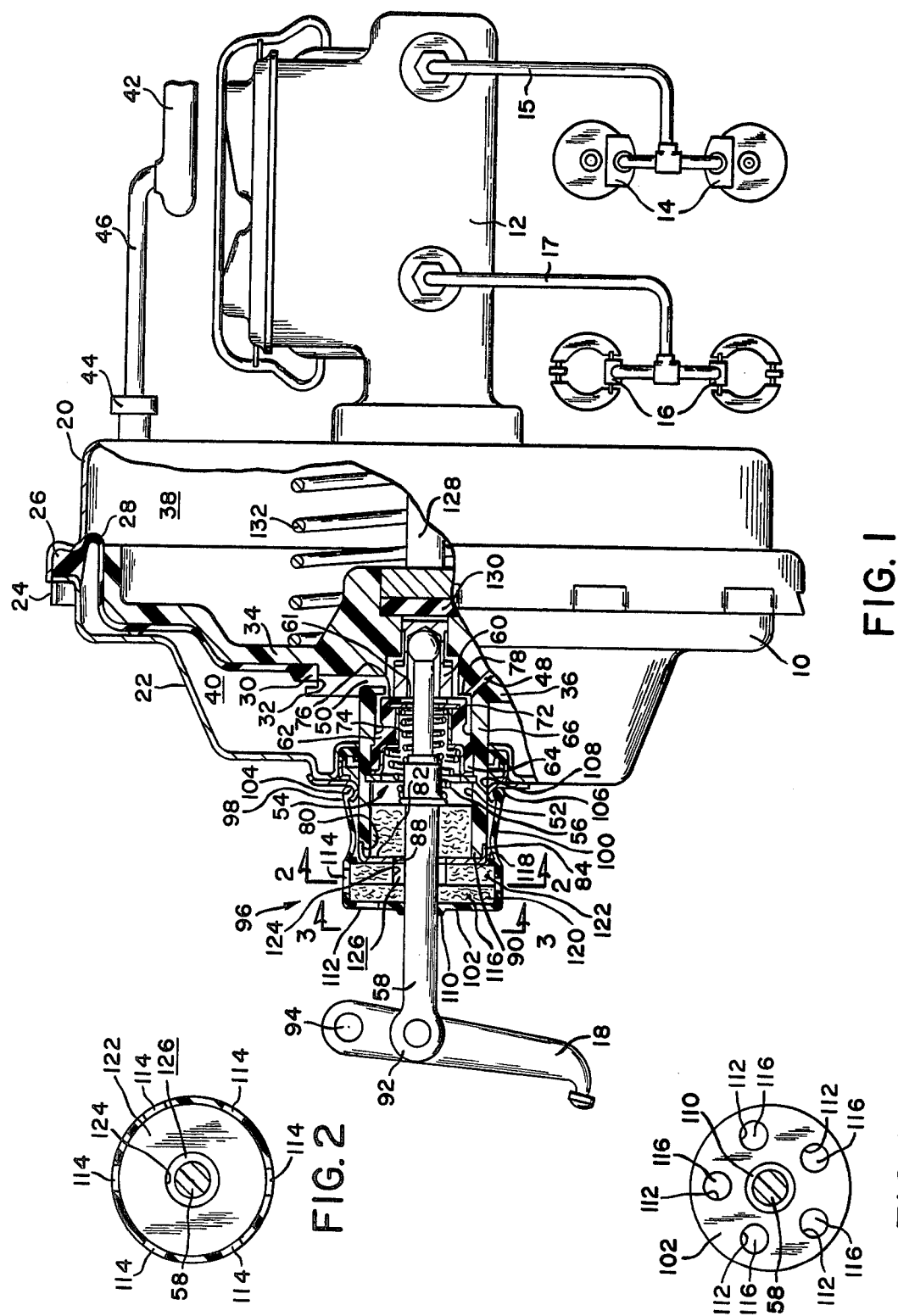
FIG. 1 is a schematic illustration of a power brake system with a partial sectional view of a servomotor having a filter and boot combination made according to the principles of this invention.
FIG. 2 is a sectional view taken along lines 2—2 of FIG. 1.
FIG. 3 is a sectional view taken along lines 3—3 of FIG. 1.

The vehicular braking system, shown in FIG. 1, has a servomotor 10 connected to a master cylinder 12 for supplying the front and rear wheel brakes 14 and 16, respectively, with pressurized hydraulic fluid in response to the transmission of an input force to brake pedal 18 by an operator.

In more particular detail, the servomotor 10 includes a housing created by joining a front shell 20 to a rear shell 22 with a twist lock fastener 24. The twist lock fastener 24 holds an external bead 26 of a diaphragm 28 between the front shell 20 and the rear shell 22. The diaphragm 28 has an internal bead 30 which snaps into a groove 32 on wall 34 which radiates from a hub 36. The wall 34 and diaphragm 28 separate the area between the front and rear shells 20 and 22 into a front chamber 38 and a rear chamber 40. The front chamber 38 is connected to a source of vacuum, such as the intake manifold 42, through check valve 44 in conduit 46. The front chamber 38 is connected to the rear chamber 40 through the hub 36 by the interconnection of a first passage 48 with a second passage 50 through axial bore or passageway 52.

A control valve 54 which is located in the axial bore 52 controls the communication of air between the axial bore 52 and the first and second passages 48 and 50.

The control valve 54 includes a return spring 56 which acts on push rod 58 to urge plunger 60 toward a poppet member 62 and allows vacuum present in the front chamber 38 to evacuate air from the rear chamber 40. The poppet member 62 has one end 64 affixed to the tubular section 66 of hub 36 by an annular retainer 70 and a free end 72 centrally located in the axial bore 52 by a coil spring 74. The coil spring 74 urges the face 76 of the free end of the poppet 62 toward a vacuum seat 78 adjacent the first passage 48. The return spring 56 is selected such that in the return or rest position as shown in FIG. 1, the coil spring 74 is overcome and vacuum present in the front chamber 38 evacuates any air present in the rear chamber 40 by flowing the same through the second passage 50 past the vacuum seat 78 through the first passage 48 and into the front chamber 38. The hub 36 has a tubular section 66 which extends through the rear shell 22.

The tubular section 66 of hub 36 has an annular groove 80 on the end thereof. A disc 82 which has an annular lip 84 is secured in groove 80 to hold a filter 86 in the axial bore 52. The disc 82 has an inner annular peripheral surface 88 which limits the radial movement of push rod 58 within the tubular section 66 to avoid damaging the end 90 of the hub 78 during rotative movement of the end 92 of brake pedal 18 about pivot pin 94. In addition, the annular peripheral surface 88 establishes the size of the flow path for the transmission of air from the atmosphere to the axial bore 52.

In order to assure that the air presented to the axial bore is clean, a boot and filter combination 96 is attached to the rear shell 22 of the servomotor 10.

The boot has a resilient member 98 with a cylindrical body 100 connected to an end closure member 102. A rib 104 on the end of the cylindrical body 100 snaps into groove 106 surrounding the opening 18 to attach the resilient member 90 to the rear shell 22. The end closure 102 has a lip 110 which surrounds and frictionally engages the push rod 58 to prevent the communication of air into the axial bore 52 along this portion of the push rod 58. The end closure member 102 has a first series of openings 112 as best shown in FIG. 3, through which air can flow into the axial bore 52 of the hub 38. In addition, the cylindrical body 98 has a second series of openings 114, as best shown in FIG. 2, through which air can also flow into the axial bore 52 of the hub 38.

A lip 118 extends radially inwardly from the cylindrical body 98 to establish a groove 120 adjacent the end closure member 102.

A first filter 116 abuts the end closure member 102. The lip 102 biases a second filter 122 into engagement with the first filter 116 such that the interface between the first and second filters 116 and 122 is located in a plane substantially parallel to the center of the second series of openings 114. The second filter 122 has an inner peripheral surface 124 which is substantially equal to the opening 88 in guide 86. The resiliency in the cylindrical body 98 holds the second filter 122 against disc 82 to create a mixing chamber 126 in the space between the inner peripheral surface 124,tthe first filter 116, the push rod 58 and filter 86. Chamber 126 provides a mixing area for combining air communicated along a first flow path through the first series of openings 112 and a second flow path through the second series of openings 114 before being communicated through filter 86 to the control valve 54.

MODE OF OPERATION OF THE INVENTION

When an operator desires to implement a brake application in a vehicle equipped with a braking system as illustrated by FIG. 1, an input force is applied to brake pedal 18. The input force causes pedal 18 to pivot about pin 94 and impart linear motion to push rod 58. Initial movement of the push rod 58 causes plunger 60 to move and allows spring 74 to seat face 76 on the vacuum seat 78 to interrupt communication from the axial bore 52 to the first passage 48. Further movement of the plunger 60 moves the atmospheric seat 61 on the end thereof away from face 76 to allow air present in the axial bore 52 to flow into the rear chamber 40 through the second passage 50.

Air enters the axial bore 52 by either flowing along a first flow path created by the first series of openings 112 in the end closure member 102 and filter 126 or a second flow path created by the second series of openings 114 in the cylindrical body 98 and filters 116 and 122. The area of the first series of openings 112 and the area of the second series of openings 114 are substantially equal thereby balancing the flow of air in the first and second flow paths. The air flowing in the first flow path and the second flow path is merged into a single flow path in mixing chamber 126 before flowing through guide 82 for presentation to the control valve 54.

Movement of control valve 52 allows air from the axial bore 52 to enter the rear chamber 40 and create a pressure differential across diaphragm 28 and wall 34 with vacuum in the front chamber 38. This pressure differential acts on the wall 34 and overcomes return spring 132 to move the hub 36 toward the front chamber 38. Movement of the hub 36 causes an output force to be transmitted through reaction disc 130 into push rod 128 connected to the master cylinder 14. The push rod 128 moves a piston arrangement (not shown) in the master cylinder 12 to develop a hydraulic fluid pressure. The hydraulic fluid pressure is transmitted through conduits 15 and 17 to provide the front and rear brakes 14 and 16 with an operational braking force.

Upon termination of the input force on brake pedal 18, return spring 56 moves plunger 60 into contact with face 61 on the end of the poppet member 62 to interrupt communication of air into the second passage 50. Further movement of the plunger 60 by return spring 56 overcomes coil spring 74 and moves face 61 away from vacuum seat 78 to allow vacuum present in the front chamber to evacuate air from the rear chamber 40. As air is evacuated from the rear chamber 40, return spring 132 moves hub 36 toward the rear chamber 40 to decrease the force acting on push rod 128 which operates the master cylinder 14. When the fluid pressure in the front chamber 38 and the rear chamber are equalized, return spring 128 holds diaphragm 28 and wall 34 against the rear shell 22 to terminate the operation of the master cylinder 12.

The speed at which air enters the rear chamber 40 from axial passage 52 is dependent on the size of the second passage 50 and the rate at which air passes through the filters 86, 116 and 122. The total area of the first and second openings 112 and 116 are equal and therefore it is assumed that the air flow through the first and second flow paths are equal. However, should the filter adjacent any of the openings 112 or 114 become clogged because of retention of airborne contaminants, the remaining openings have been sized to provide for adequate air flow sufficient to meet the operational standards set forth in the braking regulations of the Department of Transportation.

However, in the event that the filters 116 and 122 adjacent all or the majority of openings 112 and 114 become clogged with airborne contaminants, a pressure differential is created in the passageway or axial bore 52 upon actuation of the control valve 54. This pressure differential is sufficient to allow air to flow along a third flow path created along the interface between the first and second filters 116 and 122 and into mixing chamber 126. This third flow path allows a sufficient volume of air to enter the axial bore 52 and permit the servomotor 10 to be actuated and operate the brake system within the proposed regulations set forth by the Department of Transportation Standards.

I claim:

1. In a servomotor having a housing with a wall means movable therein moved by a pressure differential created between a first fluid and a second fluid to produce an output force, said first fluid being communicated into said housing by flowing through a passageway in a hub upon movement of a control valve by an input push rod responding to an operator input, flow means for assuring communication of said first fluid from a source to said passageway comprising:

a boot having an end closure section and a body section, said body section being fixed to said housing and said closure section surrounding said push rod, said closure section having a first series of openings substantially parallel to said passageway, said body section having a second series of openings substantially perpendicular to said passageway;

first filter means adjacent said first series of openings for providing a first flow path for said first fluid in said passageway; and second filter means adjacent said second series of openings for providing a second flow path for said first fluid in said passageway, said first and second flow paths merging into a single flow path adjacent said passageway in order that the flow of the first fluid into said passageway is substantially the same irrespective of the selected flow path traversed in reaching the passageway.

2. In a servomotor, as recited in claim 1 wherein said boot further includes:

a groove in said body section adjacent said end closure section, said groove aligning said first and second filter means in the center of said second series of openings.

3. In the servomotor, as recited in claim 2 wherein said boot further includes:

a lip attached to said body section for urging said first and second filter means toward said closure section to assure the first fluid passing through said first series of openings follows said first flow path through the first filter means.

4. In the servomotor, as recited in claim 3 wherein said flow means further includes:

guide means attached to the end of said hub and surrounding said push rod having an annular opening for establishing the size of said single flow path into said passageway.

5. In the servomotor, as recited in claim 4 wherein said lip aligns the interface between said first and second filter means along a plane which passes through the center of said second series of openings, said interface providing a third flow path for said first fluid should the filters in the said first and second flow paths offer resistance to flow for said first fluid.

6. In the servomotor, as recited in claim 5 wherein the area of the first and second series of openings are equal thereby providing substantially the same flow of said first fluid in said first and second flow paths.

7. In the servomotor, as recited in claim 4 wherein said second filter means has an annular inner periphery with a diameter substantially equal to said annular opening in said guide means, the space between said annular inner periphery of said second filter means, said first filter means and the push rod forming a mixing chamber where the flow of said first fluid from said first and second are combined.

* * * * *